(12) United States Patent
Bonfanti et al.

(10) Patent No.: US 7,232,858 B2
(45) Date of Patent: Jun. 19, 2007

(54) THERMOPLASTIC HYDROPHILIC ADHESIVE COMPOSITIONS FOR ATTACHMENT ON DRY AND WET SURFACES AND WITH INCREASED WATER ADHESION STABILITY

(75) Inventors: Lidia Bonfanti, Montesilvano (IT); Pietro Lunetto, Manoppello Scalo (IT); Italo Corzani, Chieti (IT); Maurizio Marchesini, Brussels (IT)

(73) Assignee: The Procter & Gamble Company, Cincinnati, OH (US)

( * ) Notice: Subject to any disclaimer, the term of this patent is extended or adjusted under 35 U.S.C. 154(b) by 731 days.

(21) Appl. No.: 10/633,963

(22) Filed: Aug. 4, 2003

(65) Prior Publication Data

US 2005/0032952 A1 Feb. 10, 2005

(30) Foreign Application Priority Data

Aug. 14, 2002 (EP) .................................. 02018338

(51) Int. Cl.
*C09B 67/00* (2006.01)
(52) U.S. Cl. ...................... 524/504; 524/500; 524/502; 524/503
(58) Field of Classification Search ................ 524/500, 524/502, 503, 504
See application file for complete search history.

(56) References Cited

U.S. PATENT DOCUMENTS

| 4,699,146 | A | 10/1987 | Sieverding |
| H1602 | H | 10/1996 | Brock |
| 5,728,146 | A | 3/1998 | Burkett et al. |
| 5,741,318 | A | 4/1998 | Ouellette et al. |
| 6,103,809 | A | 8/2000 | Ahmed et al. |
| 6,156,818 | A * | 12/2000 | Corzani et al. ............. 523/111 |

FOREIGN PATENT DOCUMENTS

| CH | 643730 | | 6/1984 |
| EP | 0 527 447 | A1 | 2/1993 |
| EP | 0 638 303 | B1 | 11/1997 |
| EP | 1 043 377 | A2 | 10/2000 |
| GB | 2 115 431 | A | 9/1983 |
| WO | WO 95/16424 | | 6/1995 |
| WO | WO 96/13238 | | 5/1996 |
| WO | WO 96/33683 | | 10/1996 |
| WO | WO 97/01311 | | 1/1997 |
| WO | WO 99/00084 | | 1/1997 |
| WO | WO 97/36968 | | 10/1997 |
| WO | WO 97/49361 | | 12/1997 |
| WO | WO 98/03208 | | 1/1998 |
| WO | WO 99/00085 | | 1/1999 |
| WO | WO 99/64077 | | 12/1999 |
| WO | WO 99/64505 | | 12/1999 |
| WO | WO 02/14417 | A1 | 2/2000 |

* cited by examiner

*Primary Examiner*—Edward J. Cain
(74) *Attorney, Agent, or Firm*—Julie A. McConihay; Peter D. Meyer; Kenya T. Pierre

(57) ABSTRACT

The present invention relates to the thermoplastic hydrophilic adhesive compositions having an increased adhesion capability and stability on moist or wet surfaces. The adhesive compositions comprise a thermoplastic hydrophilic homogeneous polymeric matrix having selected liquid absorption capacity, liquid absorption rate, and rheology. The adhesive compositions of the present invention are particularly suitable as topical adhesives for skin adhesion of articles such as disposable waste management articles, disposable absorbent articles, and personal care articles.

14 Claims, No Drawings ical level of moistness which varies among individuals,
THERMOPLASTIC HYDROPHILIC ADHESIVE COMPOSITIONS FOR ATTACHMENT ON DRY AND WET SURFACES AND WITH INCREASED WATER ADHESION STABILITY

FIELD OF THE INVENTION

The present invention relates to the thermoplastic adhesive compositions having an increased adhesion capability and stability on moist or wet surfaces, even when in contact with high amounts of aqueous fluids, particularly on moist or wet skin. In particular the present invention relates to adhesive compositions which can be employed as topical adhesives for attachment to the skin preferably in the area where absorption of bodily liquids is desired, particularly for the adhesion of sanitary napkins, pantiliners, adult incontinence products or sweat pads. The adhesive compositions provide secure attachment and increased adhesion stability on moist or wet surfaces, and, when employed as topical adhesives for attachment to skin, are also pleasing to the skin upon application, yet cause no discomfort upon removal.

BACKGROUND OF THE INVENTION

The present invention relates to adhesive compositions which are particularly useful for adhesion on moist or wet surfaces, where they provide an increased adhesion capability and stability. Particularly, the adhesive compositions of the present invention are suitable as topical adhesives for attachment to the skin, for example in absorbent articles for absorption of body fluids, such as to attach sanitary napkins or pantiliners in the genital region. Also incontinence devices which are worn e.g. in the genital region or perspiration pads which are worn in the arm pit region of a person can suitably employ the adhesive compositions of the present invention in order to be directly adhered to the wearer's skin.

Adhesive compositions for attachment to the skin have been generally disclosed in for example US statutory invention registration H1602 or WO 96/33683 and WO 95/16424. The latter discloses sanitary articles having a topical adhesive which is applied on the wearer facing side of a sanitary napkin along the entire periphery. WO 96/13238 discloses a topical adhesive which is described in terms of frequency dependency. EP 638303 discloses the use of a topical adhesive on side cuffs of sanitary napkins in order to keep the cuffs in an upright position. Swiss publication CH 643730 discloses the use of a very long sanitary napkin having chamfered outer edges with a topical adhesive at the four corners of the outer edges in order to provide a topical adhesive area well outside the region of pubic hair growth.

However all of these disclosures typically disclose a product which is designed to be utilised in combination with an undergarment and hence the degree of adhesion actually provided is very low and is not designed to withstand any excessive stress or force. Moreover the adhesive is only discussed in general terms or concentrates on the area of application of the adhesive to the article. The nature of adhesive per se other than the basic physical requirements such as pressure sensitivity are not discussed in particular with reference to the chemical composition or the adhesive criteria.

The prior art in the general field of adhesives for attachment to the skin is particularly developed in the field of articles such as band-aids, plasters and bandages. These articles are however typically applied in an emergency situation, where for example, a cut into the skin of the wearer has occurred. In this context, performance aspects of the article such as easy application and use of the product, comfortable wear as well as painless removal, and discreteness are subordinate to other criteria such as sterility, healing support, and mechanical protection of the wound. Also such wound covering absorbent articles are mostly adhered to the skin where prior to application of the absorbent article bodily hair can be removed or where little hair grows.

In order to provide in all possible situations the desired level of adhesion of such bandages, the prior art typically discloses the utilisation of certain adhesives having very high adhesive and cohesive strengths such as rubber based adhesives, comprising natural rubber or synthetic rubbers, and acrylics. In order to achieve the desired level of adhesive force upon application, and also an acceptable adhesion stability in presence of moist or wet skin, these adhesives are formulated so as to provide a very high level of initial adhesion, and are also very hard, i.e., in rheological terms, have a high elastic modulus G'. This implies these adhesives are not comfortable and skin friendly, but rather aggressive, and cause a substantial level of pain upon removal.

On the contrary, for application on the skin, and in particular for application in absorbent articles to be directly adhered to the wearer's skin, it is important that the adhesive has a skin compatible composition and is not harsh or aggressive towards the skin or cause skin irritation or inflammation. Also it is preferred if the adhesive is compliant with the skin of the wearer such that maximum skin surface contact between the adhesive and the skin is achieved. In this way a sufficient level of adhesion can be achieved even with adhesives having a non aggressive adhesive strength. Moreover, it is also desirable to provide an adhesive such that the absorbent article can be readily removed from the wearer, without the wearer experiencing any unacceptable pain level. This is particularly important under circumstances, where the article is removed and reapplication of the article once or even a number of times is required, for example to allow for urination and/or to ensure the application of such articles on sensitive skin and wearer groups such as infants. However, on the other hand the desired level of adhesion, albeit painless should of course also be maintained during such multiple applications of the article.

The problem of achieving the desired adhesion level is further exacerbated under wet skin conditions. Typically, during the placement of the article the skin has a physiological level of moistness which varies among individuals, and can also by very high.

The currently available adhesives often do not immediately strongly adhere to wet skin and may need to be held in place until sufficient minimum adhesion occurs. Moreover, the overall adhesive ability of such adhesives tends to be significantly reduced on wet skin surfaces per se, so that the article will typically not remain attached to the skin during wear if any force or stress is exerted onto the article, for example by the movement of the wearer.

Moist and wet skin however is not just a problem which is prevalent at the article application stage as a significant amount of moisture is also generated during the use of the article by the wearer by perspiration and from bodily fluids, which can also come in contact, even in large amounts, with the adhesive. With currently available adhesives the adhesive strength is reduced under such circumstances to such an extent that the article will often become detached spontaneously or under exertion of even minimal force or stress during wear.

More in general, effective adhesion capability and adhesion stability on wet or moist surfaces, either at the application stage, or with respect to moisture or liquid getting in contact with the adhesive during its use, are desirable in adhesive composition also for different uses besides the preferred application in articles, typically absorbent articles, intended to be kept in contact with the skin.

Among the adhesives known in the art as topical adhesives for attachment to dry and wet skin there are adhesives of the hydrocolloid type typically comprising a hydrophobic polymeric matrix, e.g. constituted by a synthetic rubber, preferably polyisobutylene, in which water soluble or water swellable hydrocolloids, such as for example particles of pectin, gelatin, or carboxymethylcellulose, are dispersed. In adhesive compositions of this type, the hydrophobic polymeric matrix provides the adhesive properties in dry conditions, while the dispersed hydrocolloid particles absorb aqueous fluids and render the adhesive at least to a certain extent, capable of adhering to moist surfaces, typically moist skin. Absorption is however not very efficient, since the hydrocolloid particles are surrounded by and often enclosed into a hydrophobic matrix.

An increase of the hydrocolloid content in order to enhance the liquid absorption capacity and to facilitate the access of liquids to the absorbent particles, on the other hand, can also cause the hydrocolloid adhesives to break down upon exposure to relatively large amounts of fluids, for example when they are employed for attachment to the skin of articles intended for absorption of body fluids, e.g. incontinence devices, where they typically also act as skin barriers, i.e. providing a seal against liquid leakage. Upon contact with relatively large amounts of fluids, in fact, the swelling of the hydrocolloid particles may cause the adhesive composition to lose its integrity. This results in a loss of the barrier effect, and also, very often, in residues remaining on the skin upon removal of the article. In addition, hydrocolloid adhesives are typically rather hard and not very pleasant to the skin, and may also cause pain upon removal. This is due to the particular structure of the hydrocolloid adhesives, in which the inclusion of a hydrocolloid incompatible disperse phase into a hydrophobic rubbery continuous matrix causes the resulting material to be harder, i.e., in rheological terms, having higher elastic modulus G' and storage modulus G", which, in turn, render the initial adhesion to the skin more difficult, and the removal painful.

Other known adhesive compositions that are particularly useful as topical adhesives for attachment to the skin are those having a substantially gel-like structure, and are preferably gels. They typically comprise as a prevailing component a plasticiser which is a material liquid at room temperature, and a macromolecular or polymeric component forming, in the preferred embodiments, a three dimensional network caused by physical or chemical links between the molecules. Such adhesive compositions can be classified according to the nature of the main component, i.e. usually the plasticiser. Hydrophobic compositions, also known as oil-gels, are those in which the plasticiser is typically an oil or blend of oils of vegetable or mineral origin and the polymer is usually a synthetic hydrophobic polymer, preferably an elastomer, soluble or swellable in oil(s). Hydrophilic compositions, also known as hydrogels, are those in which typically the plasticiser is water/glycerol/glycols and the like and/or mixtures thereof, and the polymeric phase is of synthetic (e.g. polyacrylics) or natural (e.g. natural gums) origin. Mixed phase compositions are also known, in which both hydrophobic and hydrophilic components, possibly in both plasticisers and polymers, form two or more separate phases.

The gel and gel-like adhesive compositions can be suitably formulated in order to have rheological and physical characteristics which render them soft and pleasant to the skin, provide firm adhesion also on skin surface with hairs, with low pain level upon removal. However, they can still be improved in their adhesion characteristics on moist or wet surfaces, typically moist or wet skin, and particularly also in the presence of a significant amount of moisture or liquid generated during the use of the adhesive, i.e. during the time the adhesive is actually adhered to the surface, e.g. the skin.

The above mentioned oil-gel type adhesives are in fact not capable of absorbing moisture or aqueous liquid due to their chemical nature, and therefore their adhesion on moist or wet surfaces is limited if none at all. Once they are adhered to a surface, e.g. the skin, they cannot withstand the presence or the build up (e.g. by sweating) of even relatively small amounts of moisture or liquid generated during the use, and loose, their adhesion capacity to a substantial extent, to the point they can spontaneously detach from the surface.

Hydrogel type adhesives on the other hand have typically a very high liquid absorption capacity, and while they are effective in presence of limited amounts of moisture or liquid on the surface when they are adhered, or generated during the use, since they can absorb such limited amounts of moisture or aqueous liquid still maintaining an acceptable level of adhesion onto the surface, their high absorption capacity can constitute a disadvantage in presence of substantial amounts of moisture or liquid: They in fact tend to absorb water to such an extent, that they dramatically change their rheology and loose their adhesion capability very quickly after contact with such high amounts of moisture or aqueous liquid.

Mixed phase adhesive compositions are typically harder than both oil-gels and hydrogels, and since they comprise a hydrophobic phase and a hydrophilic phase, they basically have the drawbacks of both oil-gels and hydrogels as described above. Moreover, if the hydrophilic phase is the disperse phase, they tend to behave like hydrocolloid adhesives upon absorption increasing the phase separation owing to the absorption into the disperse hydrophilic phase, with risk of loss of integrity as explained above.

Examples of gel or gel-like adhesives are disclosed in the prior art.

U.S. Pat. No. 4,699,146 discloses hydrophilic elastomeric pressure sensitive adhesives suitable for use with ostomy devices, bandages, ulcer pads, sanitary napkins, diapers, and athletic padding. The adhesive comprises at least an irradiation cross linked organic polymer and an adhesive plasticizer.

GB 2115431 discloses adhesives for bandages, wounds or burn dressings, EKG adhesives, sanitary napkins, diapers and ulcer pads. The adhesive comprises an irradiation cross linked organic polymer such as polyvinylpyrrolidone and an adhesive plasticizer.

Adhesion to wet skin is addressed for example in WO 98/03208 which discloses medical pressure sensitive adhesives which can adhere to dry or wet skin and which comprise a mixed phase composition comprising a mixture of hydrophilic (meth)acrylate copolymer containing tertiary amino groups, a hydrophobic (meth)acrylate copolymer containing carboxyl groups, carboxylic acids and a crosslinking system. However this document does not discuss adhesion after exposure to excess liquid.

Moreover gel-like adhesives, particularly hydrogels, need to be crosslinked in order to achieve their three dimensional network, and typically this crosslinking step occurs after application of the not crosslinked composition over a suitable substrate, hence implying a rather complex process for the formation of articles comprising said adhesives.

In addition hydrogel adhesives, owing to their capability to exchange water with the environment, lose or acquire it depending on the external conditions, and therefore can substantially change their rheology and hence their adhesive behaviour. As a consequence, hydrogel adhesives need to be stored in water- and moisture-proof packages.

Hence there still exists a need for an adhesive composition having an increased adhesion capability and stability on moist or wet surfaces, particularly on moist or wet skin, and more particularly in the presence of significant amounts of moisture or liquid, independently of whether this is upon direct application of the article to the moist or wet surface, e.g. skin, or when moisture or liquid is generated on the surface or in any case contacts the adhesive during its use. In particular it is an objective of the present invention to provide an adhesive which is liquid stable particularly to water and aqueous fluids and more particularly to body fluids such as menses, urine, or sweat in its use as topical adhesive for skin attachment, such that the adhesion properties will not be significantly affected by the presence of said fluids over the period of use of an article for the absorption of body fluids comprising the adhesive of the present invention.

It is another object of the present invention to provided an adhesive composition having the above characteristics and which is also particularly suitable in the use as a topical adhesive for skin attachment for the secure attachment and painless removal from the skin, particularly for use on sensitive skin of an infant and/or of the genitalia.

It is still another object of the present invention to provide an adhesive composition which is moisture vapour permeable, while also preferably being capable of providing a seal against liquid leakage, which is particularly desired in the preferred use as topical adhesive for attachment of articles to the skin, particularly disposable absorbent articles, where the adhesive can therefore act as skin barrier.

It is a further object of the present invention to provide an adhesive composition that also exhibits an ability to adhere to a surface, e.g. skin, upon reapplication, particularly multiple reapplication for example when an article, e.g. an absorbent article, comprising the adhesive is removed for urination purposes or is misplaced, whilst still allowing painless removal.

An additional object of the present invention is to provide an adhesive composition which provides flexibility, stretchability and contractability so that it is able to adapt to the contours of the surface where it has to be applied, and particularly of the body during all bodily movements hence be comfortable for the wearer of the article comprising the adhesive composition whilst still having sufficient adhesive capacity to ensure secure attachment during use.

It has now been surprisingly found that the above drawbacks of the known adhesives, typically employed as topical adhesive for attachment to the skin, can be substantially alleviated by providing the adhesive compositions defined hereinafter. The adhesive compositions have an increased adhesion capability and stability on moist or wet surfaces, particularly on moist or wet skin. In their preferred use as topical adhesives for skin they provide a secure attachment, and yet cause no discomfort upon removal and maintain their adhesive strength over the period of use even under exposure to excess liquids.

The adhesive compositions are also simple to produce and to incorporate into articles, namely by means of direct coating, e.g. by means of known hot melt coating techniques, onto a suitable substrate or directly onto the article. They are also substantially stable both in storage and during use, and do not necessitate a particular packaging.

All the above mentioned advantages are achieved by the adhesive composition of the present invention, which is provided by suitably formulating a thermoplastic polymeric matrix which is at the same time homogeneous and intrinsically hydrophilic, and preferably also moisture vapour permeable, as will be described hereinafter.

SUMMARY OF THE INVENTION

The present invention relates to an adhesive composition comprising a thermoplastic hydrophilic homogeneous polymeric matrix having an elastic modulus at a temperature of 37° C., $G'_{37}$, and a viscous modulus at a temperature of 37° C., $G''_{37}$. The thermoplastic hydrophilic homogeneous polymeric matrix has:

a maximum liquid absorption capacity in 24 hours, measured according to the Liquid Absorption Test described herein, of from 0.02 g/g to 5 g/g, preferably of from 0.05 g/g to 3 g/g, more preferably of from 0.1 g/g to 2.0 g/g;

a liquid absorption rate, measured according to the Liquid Absorption Test described herein, such that the liquid absorption capacity at 1 min is at least 15%, preferably at least 20%, more preferably at least 25%, of said maximum liquid absorption capacity in 24 hours;

an elastic modulus $G'_{37}$ (1 rad/s) in the range 100 Pa to 500.000 Pa, preferably 1.000 Pa to 100.000 Pa, more preferably 3.000 Pa to 70.000 Pa;

an viscous modulus $G''_{37}$ (1 rad/s) in the range 50 Pa to 200.000 Pa, preferably 300 Pa to 50.000 Pa, more preferably 500 Pa to 30.000 Pa;

the ratio $G'_{37}$ (100 rad/s)/$G'_{37}$ (1 rad/s) not greater than 20, preferably not grater than 15, more preferably not greater than 10.

DETAILED DESCRIPTION OF THE INVENTION

By saying "homogeneous" polymeric matrix it is herein intended a polymeric composition constituted by a single phase, hence where no phase separation between a continuous phase and a disperse phase is present, at least at a macroscopically detectable level, i.e., at an order of magnitude of at least about 1 μm. Of course, at the sub-micronic and intramolecular level, different phases can be present, for example in the single molecules of the components, of the composition, where e.g. typically different phases, or domains, such as those comprised in a thermoplastic block copolymer, may exist, without influencing the homogeneous nature of the matrix as described above.

By saying "thermoplastic hydrophilic" homogeneous polymeric matrix it is herein intended a thermoplastic polymeric composition which, in addition to being homogeneous as explained above, is also inherently hydrophilic, i.e. its hydrophilicity id achieved by the selection of the components of the homogeneous matrix, as will be explained in the following description, in contrast, for example, to hydrocolloid or mixed phase adhesive compositions as explained in the Background of the Invention, where hydrophilicity is provided by the inclusion in the matrix of a macroscopically separate hydrohilic phase or component.

Preferably, the thermoplastic hydrophilic homogeneous polymeric matrix of the present invention is also capable of forming a continuous layer that does not allow the flow of moisture vapour through open pores or apertures in the material, but does transfer substantial amounts of moisture vapour through the continuous layer by absorbing water on one side of the layer where the moisture vapour concentration is higher, and desorbing or evaporating it on the opposite side of the layer where the moisture vapour concentration is lower. Generally, a thermoplastic hydrophilic polymeric composition having the above described characteristics of moisture vapour permeability can be also identified as a "monolithic composition", as it is known in the art, and a moisture vapour permeable, typically liquid impermeable layer made therefrom is known as a "monolithic layer". This definition is also applicable to the thermoplastic hydrophilic homogeneous polymeric matrix of the present invention, which is therefore preferably a monolithic matrix.

The terms "breathable" and "breathability" are intended herein to correspond to "moisture vapour permeable" or "water vapour permeable", and "moisture vapour permeability" or "water vapour permeability", referred to "monolithic compositions" and "monolithic layers or films" as defined herein. "Moisture vapour" and "water vapour" are also considered to be equivalent.

Although the adhesive compositions according to the present invention can be utilized in various articles and for different uses, as will be explained hereinafter, where an increased adhesion capability and stability on moist or wet surfaces is desired, in a particularly preferred embodiment of the present invention they can be used as topical adhesives for attachment of articles to the skin of a wearer, particularly disposable absorbent articles intended for absorption of bodily liquids, such as sanitary napkins, pantiliners, adult incontinence products or sweat pads, to be attached to the wearer's skin. Therefore the adhesive compositions of the present invention will be herein described, unless otherwise stated, with reference to their preferred use as topical adhesives for skin attachment of this type of articles.

Detailed analysis of the sequence of common situations occurring from the application of absorbent articles to the time of removal of such articles has shown that specific adhesive characteristics need to be preferably satisfied in order to achieve the desired performance objectives, in particular secure initial attachment, secure sustained attachment during use and painless removal after wear. The characteristics which have been considered in this context are the elastic modulus describing the elastic behaviour of the material and the viscous modulus which describes the viscous behavior of the adhesive material.

The viscous behaviour of the adhesive can be interpreted to represent an indication of the ability of the adhesive to quickly attach and securely adhere to a particular surface. The elastic behaviour can be interpreted as an indication of the "hardness" behaviour of the adhesive and of its ability to withstand removal. Its value is also important for good initial attachment. Their combination is believed to be an indicator of the required force upon removal. The relation between elastic and viscous modulus is considered to be an indication on which fraction of the removal energy will be dissipated within the adhesive and which fraction is available to trigger the actual removal.

In order to provide adhesives for secure initial and prolonged attachment and easy/painless removal the relation between the elastic modulus and the viscous modulus as well as their dynamic behaviour is also of importance.

The adhesive composition of the present invention has an elastic modulus at a temperature of 37° C., $G'_{37}$, and a viscous modulus at a temperature of 37° C., $G''_{37}$.

According to the present invention, the adhesive compositions comprise a thermoplastic hydrophilic polymeric matrix which is homogeneous, has a selected rheology, as will be described herein, and a selected behaviour towards water, and in general aqueous fluids, and moisture, expressed in terms of a suitable combination of maximum liquid absorption capacity in 24 hours and liquid absorption rate of the thermoplastic hydrophilic homogeneous polymeric matrix, both the maximum liquid absorption capacity and the liquid absorption rate evaluated according to the Liquid Absorption Test described herein. It has in fact been discovered that not only the absolute ability of the adhesive compositions of the present invention to absorb liquid, particularly water and aqueous fluids, represented by the maximum liquid absorption capacity, is important, but also the rate at which this absorption occurs in order to provide the adhesive composition with the advantages described herein.

Even though adhesives for human skin, typically with hairs, and mucous tissues, can be classified as pressure sensitive adhesives, it is understood that the topical adhesive compositions could only with difficulty be considered typical pressure sensitive adhesives (referred to as PSA hereinafter) on the basis of the most characteristic rheological behaviour identifying such materials.

In fact as the person skilled in the art of adhesives knows, the most characteristic feature that distinguishes a PSA from other substances that can temporarily adhere objects (e.g. like water between two glass plates) is the fact that their rheological parameters and especially the Elastic Modulus G' vary greatly with the frequency of applied stresses. More in particular, G' of PSA can increase over some orders of magnitude, while the frequency of applied stresses varies from typical bonding frequency to typical debonding frequency, i.e. 1 rad/s to 100 rad/s as indicated below.

This increase of G' with frequency indicates that the adhesive has a high level of hardening in the range of frequencies representing the use conditions. The hardening of the adhesive macroscopically causes the recording of very high peel force for removal and, most importantly for skin adhesives, the occurrence of high level of pain upon removal. It is in fact known that the physiological pain sensation upon removal of a skin adhesive increases more than proportionally with the increase of G' of the adhesive in the region of frequencies typical of removal conditions. Therefore the adhesive composition of the present invention shall have a relatively limited increase of the elastic modulus G' with frequency, as will be explained below.

As indicated above adhesive compositions of the present invention, particularly useful as topical adhesives for skin attachment, have rheological characteristics which are measured at a reference temperature of 37° C. (as usual body temperature of humans) and in a range of frequencies. It has been found that upon application of a disposable absorbent article with an adhesive the adhesive contact is formed at a low frequency while debonding happens at the speed of removing the article. This speed is expressed as, a frequency of 100 rad/s, while the low frequency of forming the adhesive bond has been found to be on the order of 1 rad/s. Therefore, the frequency range for use according to the present invention is between 1 and 100 rad/s.

In order to provide good conditions of bonding, i.e., at a frequency of about 1 rad/sec, the absolute values of the elastic modulus should not be too high, otherwise the adhesive is too hard and it is not able to intimately join or mold to the surface to which it is expected to adhere. It is also important to have a relatively low absolute value of $G''$ in order to have good cohesion while the material remains soft and capable of gently adhering to skin.

It is also well known that an indicator for the cohesiveness of an adhesive material is the ratio $G''_{37}$ (100 rad/s)/$G'_{37}$ (1 rad/s)=tan ($\delta$). Accordingly, the thermoplastic hydrophilic homogeneous polymeric matrix comprised in the adhesive compositions of the present invention preferably has a tan ($\delta$) at 1 rad/s and 37° C. not greater than 2, preferably not greater than 1.5, and more preferably not greater than 1.3.

According to the present invention, the following set of rheological characteristics shall be satisfied for the thermoplastic hydrophilic homogeneous polymeric matrix comprised in the adhesive composition of the present invention:

an elastic modulus $G'_{37}$ (1 rad/s) in the range 100 Pa to 500.000 Pa, preferably 1.000 Pa to 100.000 Pa, more preferably 3.000 Pa to 70.000 Pa;

a viscous modulus $G''_{37}$ (1 rad/s) in the range 50 Pa to 200.000 Pa, preferably 300 Pa to 50.000 Pa, more preferably 500 Pa to 30.000 Pa;

the ratio $G'_{37}$ (100 rad/s)/$G'_{37}$ (1 rad/s) not greater than 20, preferably not grater than 15, more preferably not greater than 10.

Differently from the adhesive compositions of the prior art, the adhesive compositions of the present invention comprise a thermoplastics polymeric matrix which is homogeneous, and intrinsically hydrophilic, i.e., hydrophilic per se, rather than, e.g. being provided with a certain degree of hydrophilicity by means of the addition of a macroscopically dispersed hydrophilic component such as in the hydrocolloid adhesives.

The thermoplastic hydrophilic homogeneous polymeric matrix comprised in the adhesive compositions of the present invention has a maximum liquid absorption capacity in 24 hours, evaluated according to the Liquid Absorption Test described herein, of from 0.02 g/g to 5 g/g; preferably, of from 0.05 g/g to 3 g/g, more preferably of from 0.1 g/g to 2.0 g/g.

The thermoplastic hydrophilic homogeneous polymeric matrix comprised in the adhesive compositions of the present invention also has a liquid absorption rate, evaluated according to the Liquid Absorption Test described herein, such that the liquid absorption capacity at 1 min is at least 15%, preferably at least 20%, more preferably at least 25%, of said maximum liquid absorption capacity in 24 hours.

Accordingly, the adhesive compositions of the present invention are capable of absorbing a relatively limited amount of liquid, typically water or aqueous fluids, at a rather high rate, and as a result such adhesives are capable of effectively adhering to wet and moist surfaces, for example moist or wet skin, and owing to the combination of relatively limited liquid absorption capacity, measured as maximum liquid absorption capacity in 24 hours, and high liquid absorption rate, they maintain their adhesive strength also in the presence of excess liquid or high moisture levels, irrespectively of whether the moisture or liquid is already present on the surface at the time adhesion is achieved, or is generated directly at the surface, or alternatively comes in direct contact with the adhesive during the time the adhesive, is adhered to the surface, e.g., during the wearing time of a disposable absorbent article adhered to the wearer's skin by means of the adhesive composition of the present invention.

This is different, for example, to the behaviour of hydrogel type adhesives, which instead absorb very rapidly so large amounts of liquid that they substantially loose their adhesive strength quickly.

According to the present invention, the thermoplastic hydrophilic homogeneous polymeric matrix comprised in the adhesive composition at least comprises a first polar cohesive thermoplastic polymer, or blend of polar cohesive thermoplastic polymers, at least a second polar adhesive thermoplastic polymer, or blend of polar adhesive thermoplastic polymers, a compatible plasticiser, or blend of compatible plasticisers, and optionally a tackifying resin, or blend of tackifying resins.

As intended herein, by "polar" thermoplastic polymer it is meant a thermoplastic polymer having a high polar character.

The polar character of a thermoplastic polymer is a measure of its hydrophilicity, i.e. of its affinity for water, and can be measured by means of a suitable polarity parameter. A suitable polarity parameter for a given substance can be selected among a number of parameters which are well known in the scientific literature, and are measurable according to known methods. A suitable polarity parameter can be for example the so called Hildebrand solubility parameter H.

According to the present invention, a thermoplastic polymer comprised as the first cohesive thermoplastic polymer or as the second adhesive thermoplastic polymer in the thermoplastic hydrophilic homogeneous polymeric matrix is also polar, i.e. has a high polar character, if it has a value for the Hildebrand solubility parameter H of at least 18 $MPa^{1/2}$. In case the thermoplastic polymer has, at an intramolecular level, separate phases, such as for example the domains in a thermoplastic block copolymer typically selectable as a first polar cohesive thermoplastic polymer, having different values of the Hildebrand solubility parameter, the highest of said different values, i.e., the most polar phase in the copolymer structure, has to be taken into consideration for the selection of the thermoplastic polymer.

The first polar thermoplastic polymer, comprised in the thermoplastic hydrophilic homogeneous polymeric matrix, is also cohesive, i.e., has a high degree of internal cohesion. According to the present invention, a cohesive thermoplastic polymer is defined as having a Melt Flow Index (MFI), measured according to the ASTM D 1238 test method, of less than 2500, preferably of less than 2000, more, preferably of less than 1000.

According to a preferred embodiment of the present invention, said first polar cohesive thermoplastic polymer, or at least one polymer of said blend of polar cohesive thermoplastic polymer, is selected among thermoplastic elastomers. More preferably, in a blend of polar cohesive thermoplastic polymers, all such, polymers are polar cohesive thermoplastic elastomers.

The second polar adhesive thermoplastic polymer of the thermoplastic hydrophilic homogeneous polymeric matrix comprised in the adhesive composition of the present invention can be suitably, selected among those. polymers which are well known in the field of thermoplastic adhesive compositions, and which are also polar, according to the definition provided above. Such polar adhesive thermoplastic polymers can be selected among those being adhesive per se, i.e., by being pressure sensitive as such, or alternatively among those which can be readily rendered adhesive, or tackified, by means of the addition of a suitable tackifying resin or resins, as it is known in the art.

According to a particularly preferred embodiment of the present invention, the first polar cohesive thermoplastic polymer, or at least one polymer in the blend of polar cohesive thermoplastic polymers, in addition to being polar, also has the capability of effectively absorb liquid, typically water or more in general aqueous fluids. Even more preferably, all polar cohesive thermoplastic polymers in such a blend have the preferred liquid absorption capacity. Preferably, also the second polar adhesive thermoplastic polymer, or at least one polymer in the blend of polar adhesive thermoplastic polymers, and more preferably all of them, is/are selected in order to also have the capability of absorbing liquid, typically water or more in general aqueous fluids.

According to the present invention, said liquid absorption capacity for the first polar cohesive and/or for the second polar adhesive thermoplastic polymer or respective blends of thermoplastic polymers is expressed in terms of maximum liquid absorbent capacity in 24 hours, evaluated according to the Liquid absorption Test described herein.

Preferably, the liquid absorption capacity for said first polar cohesive thermoplastic polymer or polymers, and/or for said second polar adhesive thermoplastic polymer or polymers, consists in a maximum liquid absorption capacity in 24 hours of at least 0.01 g/g, more preferably of at least 0.02 g/g, most preferably of at least 0.05 g/g, wherein the liquid absorption capacity is evaluated according to the Liquid Absorption Test described herein.

Of course polar cohesive thermoplastic polymer or polymers and/or polar adhesive thermoplastic polymer or polymers which do not have the preferred liquid absorption capacity, i.e. which although polar do not absorb liquid, or in any case have a maximum liquid absorption capacity in 24 hours of less than 0.01 g/g according to the Liquid Absorption Test, can be comprised in the thermoplastic hydrophilic homogeneous polymeric matrix comprised in the adhesive composition of the present invention, but preferably they should overall constitute not more than 70%, more preferably not more than 60%, even more preferably not more than 50%, of the total weight of said polar cohesive thermoplastic polymer or polymers and of said polar adhesive thermoplastic polymer or polymers.

Conversely, the thermoplastic hydrophilic homogeneous polymeric matrix comprised in the adhesive composition of the present invention can comprise polar cohesive thermoplastic polymer or polymers and/or polar adhesive thermoplastic polymer or polymers, which is/are soluble or dispersible in liquid, namely in the saline solution containing 0.9% by weight of sodium chloride in water which is used in the Liquid Absorption Test. In this case, as will be explained in the test method description, the liquid absorption capacity of a liquid soluble or dispersible thermoplastic polymer will be considered infinite, and therefore satisfying the preferred condition of the maximum liquid absorption capacity explained above for the first and the second thermoplastic polymer or polymers. However, according to the present invention, and as will be explained more in detail hereinafter, it is preferred that the thermoplastic hydrophilic homogeneous polymeric matrix overall comprises not more than 25%, more preferably not more than 15%, most preferably not more than 10%, by weight of said matrix, of one or more components which are soluble or dispersible in a saline solution containing 0.9% by weight of sodium chloride in water.

According to the present invention, the first polar cohesive thermoplastic polymer, or blend of polar cohesive thermoplastic polymers, comprised in the thermoplastic hydrophilic homogeneous polymeric matrix can be selected from the group consisting of: polyurethanes; polyether- polyester- and polyetherester-amide block copolymers; ionomers; polyesters and copolyesters; polyetherester block copolymers; polyamides and copolyamides; polyethylene vinylacetate with vinylacetate content of at least 28%; polyethylene acrylic and methacrylic esters copolymers; polyethylene acrylic acid copolymers; polyethylene vinyl alcohol copolymers; styrenic block copolymers and polyolefins polarly modified by insertion or grafting of, or by copolymerization with, highly polar groups/monomers, such as e.g. maleic or succinic anhydride, carbon monoxide, sulphonic groups, etc.; and blends thereof. Preferred examples of such polarly modified styrenic block copolymers and polyolefins are styrene-ethylene-butylene-maleic anhydride copolymers and copolymers or terpolymers of ethylene with typical polar comonomers such as (meth) acrylic acid, acrylic esters, vinyl esters, maleic anhydride, glycidyl methacryate, and combinations thereof.

Preferred polar cohesive thermoplastic polymers are thermoplastic elastomers selected from the group consisting of: polyurethanes; polyether- polyester- and polyetherester-amide block copolymers; ionomers; polyetherester block copolymers; styrene-ethylene-butylene-maleic anhydride copolymers; and blends thereof.

Particularly preferred polar cohesive thermoplastic polymers according to the present invention are selected from the group consisting of: polyurethanes; polyether- polyester- and polyetherester-amide block copolymers; ionomers; polyetherester block copolymers; and blends thereof, which also have the preferred maximum liquid absorption capacity.

According to the present invention, the second polar adhesive thermoplastic polymer, or blend of polar adhesive thermoplastic polymers, comprised in the thermoplastic hydrophilic homogeneous polymeric matrix can be selected among the group consisting of: sulfonated polyester; thermoplastic polyacrylates; polyvinyl pyrrolidone and its copolymers such as polyvinyl pyrrolidone vinyl acetate copolymer; polyvinyl ethers; polyvinyl alcohol; polyethylene oxide; polyketones; and blends thereof.

Preferred polar adhesive thermoplastic polymers are selected from the group consisting of: sulfonated polyesters; thermoplastic polyacrylates, polyvinyl pyrrolidone and its copolymers; polyvinyl ethers; and blends thereof.

The thermoplastic hydrophilic homogeneous polymeric matrix comprised in the adhesive compositions of the present invention further comprises a compatible plasticiser, or a blend of compatible plasticisers, as will be explained hereinbelow.

The first and second thermoplastic polymers (or blend of thermoplastic polymers) as mentioned above, comprised in the thermoplastic hydrophilic homogeneous polymeric matrix comprised in the adhesive compositions of the present invention, can be typically highly viscous in the molten state at the process conditions that are typical of the known formation processes, e.g. an extrusion process involving a high power screw extruder. For example they may have a viscosity higher than 5000 poise at a temperature of 20° C. above the DSC (Differential Scanning Calorimetry) melting point, which is the temperature identified as that corresponding to the DSC peak, or corresponding to the highest DSC peak in case of a mixture of polymers showing more, than one peak, and at a frequency of 1 rad/sec.

The thermoplastic hydrophilic homogeneous polymeric matrix comprised in the adhesive compositions of the present invention, comprising the first and second thermoplastic polymers or blends of thermoplastic polymers, can therefore still be highly viscous in the molten state at the process conditions.

According to the present invention, and as disclosed in our patent applications WO 99/64077 or WO 99/64505, the viscosity of the thermoplastic hydrophilic homogeneous polymeric matrix comprised in the adhesive compositions of the present invention can be adjusted by including in the thermoplastic hydrophilic homogeneous polymeric matrix a suitable plasticiser, or blend of suitable plasticisers, that is compatible with the first and second thermoplastic polymers and that lowers the viscosity of the thermoplastic hydrophilic homogeneous polymeric matrix in the molten state at the process conditions.

Suitable hot melt coating processes are in fact preferred to process the compositions, as explained in the above mentioned patent applications WO 99/64077 and WO 99/64505. This implies that the viscosity in the thermoplastic hydrophilic; homogeneous polymeric matrix at the process conditions has to be adjusted to a suitable low level.

In such a case, the thermoplastic hydrophilic homogeneous polymeric matrix of this preferred embodiment of the present invention comprises a suitable plasticiser or blend of plasticisers such that it preferably has the following complex viscosities ($\eta^*$):

5 poise<$\eta^*$<4000 poise, preferably 10 poise<$\eta^*$<2000 poise, more preferably 10 poise<$\eta^*$<1000 poise, at a frequency of 1 rad/s, and $\eta^*$<2000 pose, preferably $\eta^*$<1000 poise, more preferably $\eta^*$<500 poise, at a frequency of 1000 rad/s, said complex viscosities ($\eta^*$) at a process temperature (T) comprised between 110° C. and 210° C., preferably between 130° C. and 180° C., more preferably between 140° C. and 170° C., wherein $\eta^*$ represents the complex viscosity of the thermoplastic hydrophilic homogenous polymeric matrix of the present invention. According to the present invention the complex viscosity $\eta^*$ of the thermoplastic hydrophilic homogenous polymeric matrix is measured using a RDA-II Rheometer available from Rheometrics Co. (US).

According to this preferred embodiment of the present invention the thermoplastic hydrophilic homogeneous polymeric matrix having the complex viscosity described above allows for a layer to be coated onto a substrate using typical coating conditions and apparatuses known in the art for the coating of low viscosity hot melt compositions in a layer having a required thickness onto a substrate, while also keeping the advantageous characteristics of the preferred thermoplastic hydrophilic homogeneous polymeric matrix of the present invention in providing an adhesive composition having the beneficial characteristics described herein.

The plasticiser or blend of plasticisers comprised in the thermoplastic hydrophilic homogenous polymeric matrix has the primary object of adjusting the rheological characteristics of the adhesive compositions of the present invention, i.e., in addition to the suitable modification of the melt viscosity at the process conditions, as explained above, the plasticiser or blend of plasticisers modifies the rheological parameters of the matrix such as the rheological moduli G' and G" in order to help develop and optimize the desired adhesion characteristics in the adhesive composition of the present invention.

Suitable compatible plasticisers comprised in the thermoplastic hydrophilic homogeneous polymeric matrix according to this preferred embodiment of the present invention include citric acid esters, tartaric acid esters, benzoic acid esters, sucrose esters, tri-mellitates, sorbitol, urea, epoxidized vegetal oils, polymerised vegetal oils, castor oil and its derivatives, phthalates, liquid polyesters, liquid polyamides, glycolates, aromatic sulfonamides, polyhydric alcohols and their esters, glycerol and its esters, pentaerythritol and its esters, glycols and polyglycols and their esters and ethers, polyethylene glycol-polypropylene glycol block copolymers, sorbitan esters, phosphates, lactic acid and its esters, mono- and dicarboxylic fatty acids ($C_8$–$C_{22}$) and their esters, esters of mono- and dicarboxylic fatty acids ($C_8$–$C_{22}$) hydrophilically modified by insertion in the molecular chain of 1 to 40 moles of ethylene oxide and/or of propylene oxide per mole of base ester, polyethers and their derivatives, and blends thereof.

According to a particularly preferred embodiment of the present invention particularly preferred plasticisers are hydrophilic plasticisers such as citric acid esters, aromatic sulfonamides, benzoates, glycols and polyglycols and their esters, glycerol and its esters, and blends thereof, some of them as disclosed in our application WO 99/64505. Said particularly preferred hydrophilic plasticisers have a particularly high polar character and provide the further advantage that they do not impair, and possibly can even contribute to, the moisture vapour permeability of a resulting layer of the adhesive composition of the present invention formed from the thermoplastic hydrophilic homogeneous polymeric matrix comprising said first and second thermoplastic polymers and said suitable compatible plasticiser or blend of plasticisers.

The particularly preferred hydrophilic plasticiser or blend of plasticisers can also typically adjust the hydrophilicity of the thermoplastic hydrophilic homogeneous polymeric matrix comprised in the adhesive composition of the present invention, in order to help provide the matrix with the desired level of maximum liquid absorption capacity and liquid absorption rate.

Optionally, and preferably, a tackifying resin or alternatively a blend of tackifying resins can be included in the thermoplastic hydrophilic homogeneous polymeric matrix comprised in the adhesive composition of the present invention. A tackifying resin, or blend of tackifying resins, is preferably included in order to help provide the desired level of tackiness in the adhesive composition of the present invention. Specifically, the addition of a tackifying resin, or of a blend of tackifying resins, is meant to further enhance and control the tackiness level of the thermoplastic hydrophilic homogeneous polymeric matrix already provided by a second thermoplastic polymer which is intrinsically adhesive, i.e., with pressure sensitive characteristics. Alternatively, the addition of a tackifying resin or blend of tackifying resins actually provides with tackiness a second thermoplastic adhesive polymer which is not pressure sensitive as such, but is alternatively selected among those which can be readily rendered adhesive, or tackified, by means of the addition of a suitable tackifying resin or blend of resins, as explained hereinabove.

Suitable tackifying resins can be selected rosins and rosin esters, aromatic and aliphatic-aromatic resins, terpene and terpene-phenolic resins, aromatic acrylic resins, and blends thereof, as disclosed for example in our patent applications WO 99/64077 or WO 99/64505. Preferred are rosins and rosin esters, and aromatic acrylic resins. Particularly preferred are for example the tackifying resins produced by Eastman and available under the codes Res A-2690, Res A-2691, Res A-2682, Res A-2683, Res A-2698, which have a high polar character, as disclosed in our patent application WO 02/14417.

Preferably the thermoplastic hydrophilic homogeneous polymeric matrix comprised in the adhesive composition of the present invention comprises from 1% to 50%, preferably from 3% to 40%, more preferably from 5% to 25%, by weight of said matrix, of the first polar cohesive thermoplastic polymer; from 1% to 80%, preferably from 3% to 60%, more preferably from 5% to 50%, by weight of said matrix, of the second adhesive thermoplastic polymer; from 5% to 85% preferably from 7% to 75%, more preferably from 10% to 60%, by weight of said matrix, of a compatible plasticiser, or blend of compatible plasticisers; and from 0% to 45%, preferably from 5% to 35%, more preferably from 10% to 30%, by weight of said matrix, of a tackifying resin, or blend of tackifying resins.

The thermoplastic hydrophilic homogeneous polymeric matrix comprised in the adhesive composition of the present invention may in addition comprise additional optional components to further improve the processability of the compositions and also the mechanical characteristics as well as other characteristics as resistance to ageing by light and oxygen, visual appearance etc., of the layers formed from such thermoplastic hydrophilic homogeneous polymeric matrix. Such other optional components may include antioxidants, UV-stabilizers, surfactants, dyes, and mixtures thereof, which may be present within the thermoplastic hydrophilic homogeneous polymeric matrix at a level of up to 10% by weight of the matrix.

Furthermore, solid filler compounds can also be optionally dispersed into the thermoplastic hydrophilic homogeneous polymeric matrix, such as for example silica, Zn oxide, calcium carbonate, zeolites, pigments, laponite, etc.

Although not particularly preferred, known absorbent gelling materials in particle or in fibre form can be also optionally dispersed into the thermoplastic hydrophilic homogeneous polymeric matrix.

Active agents, i.e. compounds which are, capable of releasing an active substance, e.g. to the skin, such as for example a cosmetic or pharmaceutical substance, a perfume, etc. can also be optionally included in the thermoplastic hydrophilic homogeneous polymeric matrix.

While not particularly preferred, the thermoplastic hydrophilic homogeneous polymeric matrix comprised in the adhesive composition of the present invention can comprise one or more components which are soluble or dispersible typically in water or aqueous fluids. For example a plasticiser can be soluble or dispersible in water or aqueous fluids. According to the present invention, it is preferred that the thermoplastic hydrophilic homogeneous polymeric matrix comprises not more than 25%, more preferably not more than 15%, most preferably not more than 10%, by weight of said matrix, of one or more components which are soluble or dispersible in a saline solution containing 0.9% by weight of sodium chloride in water. A component is considered to be soluble or dispersible when it is soluble or dispersible in said saline solution in a concentration of at least 0.3% by weight.

An adhesive composition according to the present invention comprising the thermoplastic hydrophilic homogeneous polymeric matrix can be manufactured with any known process that will typically comprise the steps of providing at least the first polar cohesive thermoplastic polymer, or blend of polar cohesive thermoplastic polymers, the second polar adhesive thermoplastic polymer, or blend of polar adhesive thermoplastic polymers, and the compatible plasticiser or blend of compatible plasticisers, and optionally the tackifying resin or blend of tackifying resins and any further additional components as explained above, possibly comprising components to be dispersed into the matrix, and not actually being part of the thermoplastic hydrophilic homogeneous polymeric matrix, melting the components and compounding them, e.g. with a known suitable mixer to form the adhesive composition, i.e. the thermoplastic hydrophilic homogeneous polymeric matrix plus optionally further components, in the molten state for subsequent process steps.

A process for making a layer of the adhesive composition according to the present invention typically comprises the steps of providing said composition, heating it to make it flowable, and forming said composition in the molten, semi-molten, or plastic state onto a substrate in a layer having the desired thickness, e.g. preferably with a hot melt coating process as explained above.

Alternatively, solvent or emulsion systems can be created and used to process the thermoplastic hydrophilic homogeneous polymeric matrix comprised in the adhesive composition of the present invention, either as an intermediate or final step in making said adhesive compositions, or composite structures comprising a layer of said adhesive composition coated onto a selected substrate, or articles comprising said adhesive compositions or said structures.

Typical materials for said substrate include nonwoven materials, wovens, open celled thermoplastic foams, closed-cell thermoplastic foams, composites of open celled foams and stretch nonwoven, and films.

According to a preferred embodiment of the present invention, the adhesive composition comprising the thermoplastic hydrophilic homogeneous polymeric matrix can be formed into a continuous layer which is moisture vapour permeable, while being capable of providing a liquid barrier. This increases the wearer's comfort in the use of the adhesive composition as a topical adhesive for skin attachment, wherein at the same time the adhesive composition also acts as a skin barrier and provides a seal effect against liquid leakage, which is particularly useful when the adhesive composition is incorporated into a disposable article for the absorption of body fluids, intended to be attached directly to the wearer's skin. Moisture permeability and liquid barrier are also preferred in other uses of the adhesive composition of the present invention different from the incorporation into absorbent articles, as will be explained hereinbelow.

According to the present invention a moisture vapour permeable, liquid impervious continuous layer can be formed from the adhesive composition of the present invention, for example by laying with a known method said adhesive composition onto a suitable substrate, which is typically also moisture vapour permeable. The adhesive compositions of the present invention preferably have a moisture vapour transmission rate of at least 200 $g/m^2$ 24 h, more preferably of at least 300 $g/m^2$ 24 h, even more preferably of at least 500 $g/m^2$ 24 h, with a thickness of said layer or film of at least 20 µm, said water vapor transmission rate measured according to the ASTM E-96B "Upright Cup" Method.

According to the present invention, typically continuous layers can be formed from the adhesive compositions described so far which have a thickness of from about 5 µm to about 2500 µm and above, said layers being typically used in combination with different substrates, such as for example in a composite laminated structure comprising a nonwoven fibrous substrate.

The adhesive compositions of the present invention can be used in a number of different articles and structures, as will be explained hereinbelow.

Articles Comprising the Adhesive Composition

In a preferred embodiment herein, the present invention is directed to Personal Care products, capable of adhering to the wearer's skin, which contain an adhesive composition according to the present invention having the characteristics described above.

For the purpose of the present invention, personal care products means products, disposable or reusable, which are designed to be worn by a human in contact or close proximity to the body in order to achieve a function directed to the person's health, well-being, comfort or pleasure, and thus require temporary adhesion to the body.

A first type of such articles includes disposable, human waste management devices such as urine, menstrual and faecal management devices.

Disposable Waste-Management Devices

Urine, menstrual or faecal management devices herein include bags having an aperture and a flange surrounding the aperture for adhesive attachment to the urogenital area and/or the perianal area of a wearer. Any faecal, menstrual or urine management device known in the art can be provided with an adhesive composition according to the present invention. Such devices are described for example in WO 99/00084 and WO 99/00085.

The urine, menstrual or faecal management devices herein also include devices designed to be attached to artificial apertures in the body, such as ostomy/colostomy devices.

The bag as used in such articles is a flexible receptacle for the containment of urine, menstrual and excreted faecal matter.

The bag is designed to safely contain any entrapped material, typically it will be liquid impermeable, yet it may be breathable. The bag is designed of sufficient strength to withstand rupture in use, also when pressure on the bag is exerted in typical wearing conditions, such as sitting.

The bag may contain absorbent material. The absorbent material may comprise any absorbent material which is capable of absorbing and retaining liquids. The absorbent material may comprise a wide variety of liquid-absorbent materials commonly used in disposable diapers and other absorbent articles such as comminuted wood pulp, which is generally referred to as airfelt.

The human waste management device, in particular urine/menstrual management devices according to the present invention, may also comprise an additional acquisition layer. The acquisition layer is typically secured to the inner surface of bag. However, the acquisition layer may also be secured to the flange, or both the flange and the inner surface of bag. The acquisition layer is preferably positioned such that it separates the genitalia of the wearer from coming into direct contact with the absorbent material. The acquisition layer is fluid pervious allowing urine/menses to readily pass through so that it may be absorbed by absorbent material.

The bag is provided with an aperture whereby excreted matter is received from the body prior to storage within the bag cavity. The aperture is surrounded by a flange and may be provided in any shape or size, such as circular, oblong, heart shaped and may be symmetrical or asymmetrical preferably the aperture has an oblong configuration either in the longitudinal or in the transversal direction or in both directions, e.g. the contours of the aperture are in the shape of two ellipses with the respective main axes being substantially perpendicular.

The flange comprises a garment facing surface and a wearer facing surface. In a preferred embodiment these are two large, substantially flat surfaces, however, the flange may also comprise projections designed to fit the perineal or coccygeal area of the wearer.

The flange should be made of soft, flexible and malleable material to allow easy placement of the flange to the perianal area. Typical materials include nonwoven materials, wovens, open celled thermoplastic foams, closed-cell thermoplastic foams, composites of open celled foams and stretch nonwoven, and films.

The adhesive composition of the present invention can be applied to the wearer facing surface of the flange by any means known in the art such as slot coating, spiral, or bead application or printing. Typically the adhesive is applied at a basis weight of from 10 $g/m^2$ to 2500 $g/m^2$, more preferably from 100 $g/m^2$ to 2000 $g/m^2$ most preferably from 200 $g/m^2$ to 1500 $g/m^2$ depending on the end use envisioned. For example, for faecal management devices to be used for babies the amount of adhesive may be less than for faecal management devices designed for active adult incontinence sufferers.

Disposable Absorbent Articles

Another type of personal care articles herein include disposable absorbent articles such as diapers, sanitary napkins or catamenials, pantiliners, tampons, perspiration pads. Absorbent articles are articles containing an absorbent core, and can be made by any of the ways usual in the art. The application of the adhesive composition of the present invention to the wearer facing surface, typically the topsheet surface of an absorbent article, should not cause major problems to those skilled in the art since it can be provided by any well known techniques commonly used to apply adhesives. Most preferably the adhesive is provided in a pattern of small incremental areas such as dots or similar.

This invention can be used beneficially on disposable absorbent articles which are applied directly to the skin of a user. The article usually exhibits absorbency for bodily fluids, the protection of the user's garments from soiling, is comfortable to the user, and is easy to produce and to package.

Other Personal Care Products

According to the present invention the adhesive composition herein may also find application to other personal care products. The adhesives may for example find utility to adhere functional articles which adhere to the skin such as cosmetic or pharmaceutical delivery articles which provide a substance to the skin such as skin treatment substances, cream, lotions, hormones, vitamins, deodorants, drugs; cosmetic or pharmaceutical delivery articles provide a substance to emanate away from the skin such as insecticides, inhalation drugs, perfumes, etc.; functional articles which are not necessarily attached to the skin, but which require a high residence time on the skin such as decorative cosmetics, lipstick, eye shadow, stage make-up) and cleaning articles (hand cleaners, face masks and hygienic pore cleansers). Such articles are preferably non-absorbent for bodily liquids.

The adhesive may also in addition find application to attach articles to the skin such as protective articles such as genital-, knee-, or elbow-protectors or bandages; clothing such as bras, surgical gowns, or parts of garments during fitting at a tailor; nasal plasters; prosthesis such as breast replacements or wigs; cold wraps e.g. to provide pain relief from bruises and to reduce swelling; thermal wraps comprising thermal cells as disclosed for example in WO 97/36968 and WO 97/49361 to provide relief of temporary and chronic pain such as neck wraps as disclosed in for example U.S. Pat. No. 5,728,146, knee wraps exemplified in WO 97/01311, and back wraps as disclosed for example in U.S. Pat. No. 5,741,318; hearing aids; protective face masks (for the reduction or prevention of inhalation of noxious substances); anti-snoring patches, ornamental articles such as jewellery, earrings, guises, tattoos; goggles or other eye wear, tapes, bandages, dressings of general utility, wound healing and wound management devices; and biomedical skin electrodes such as ECG, EMG, EEG, TENS electrosurgery, defibrillation, EMS and electrodes for facial/beauty applications; and fixation products and/or devices intended to affix patient catheters, tubing leadwires cables, etc.

Other Articles

The adhesive compositions of the present invention can also find use in articles which do not involve attachment to human skin, such as for example wallpapers, carpets, adhesive tapes, etc.

EXAMPLES

The present invention will be illustrated with the following examples. All compositions in all examples herein are given in percent by weight, unless otherwise stated.

Example 1

A thermoplastic hydrophilic adhesive composition was prepared by melt compounding between 140° C. and 160° C. in a heated blender for hot melts, type COMER 3000, available from Fratelli Erba s.r.l., Italy, the ingredients below:

| | |
|---|---|
| Eastman AQ 14000 (adhesive sulfopolyester available from Eastman) | 52% |
| Pebax 2533 SA (poly-ether amide available from Atofina) | 10% |
| Eastman A 2683 (tackifying resin available from Eastman) | 21% |
| Benzoflex 9-88 SG (di-propylene glycol di-benzoate plasticizer available from Velsicol) | 16% |
| Irganox B 225 (antioxidant available from Ciba-Geigy) | 1% |

The composition does not contain any ingredient soluble or dispersible in the physiological saline solution used as test liquid for maximum liquid absorption capacity and liquid absorption rate.

The composition, tested for liquid absorption capacity and liquid absorption rate according to the method described herein, had a maximum liquid absorption capacity in 24 hours of 0.62 g/g. In the first 60 seconds of immersion in the test liquid, the composition absorbs 0.26 g/g i.e. 42% of its maximum liquid absorption capacity in 24 hours.

The rheological parameters of the composition at 37° C. and at the frequencies of 1 rad/s or of 100 rad/s were measured by using a rheometer RDA II, available from Rheometrics, and were found to be:

$G'_{37}$, 1 rad/s=2.02·10$^5$ Pa $G''_{37}$, 1 rad/s=7.66·10$^4$ Pa $(G'_{37}, 100$ rad/s$/G'_{37}, 1$ rad/s$)=3.02$ Example 2

A thermoplastic hydrophilic adhesive composition was prepared in a similar way as in Example 1, except that the compounded ingredients were the following:

| | |
|---|---|
| HRJ 10127 (adhesive acrylic esters copolymer available from Schenectady) | 10% |
| Pebax 2533 SA (poly-ether amide available from Atofina) | 15% |
| Eastman A 2683 (tackifying resin available from Eastman) | 20% |
| Uniplex 280 (sucrose benzoate plasticizer available from Unitex) | 20% |
| Benzoflex 9-88 SG (di-propylene glycol di-benzoate plasticizer available from Velsicol) | 25% |
| Tri-ethyl citrate (plasticizer available from Aldrich) | 9% |
| Irganox B 225 (antioxidant available from Ciba-Geigy) | 1% |

The composition contains 9% by weight of tri-ethyl citrate which is an ingredient soluble in the physiological saline solution used as test liquid for liquid absorption capacity and liquid absorption rate. Therefore when tested for liquid absorption capacity and liquid absorption rate, according to the Liquid Absorption Test method described herein, the reference initial weight of the "dry" film before contact with the test liquid was considered to be 91% of the actually measured weights of the dry films in the tested samples, represented by the term $[S_{dry\ i}-NW_{dry\ i}]$ in the formula of the Liquid Absorption Test. Under such testing conditions, the composition showed a maximum liquid absorption capacity in 24 hours 0.48 g/g. In the first 60 seconds of immersion in the test liquid, the composition absorbs 0.28 g/g i.e. 58% of its maximum liquid absorption capacity in 24 hours.

The rheological parameters of the composition at 37° C. were found to be:

$G'_{37}$, 1 rad/s=1.3·10$^4$ Pa $G''_{37}$, 1 rad/s=4.4·10$^3$ Pa $(G'_{37}, 100$ rad/s$/G'_{37}, 1$ rad/s$)=3.42$ Example 3

A thermoplastic hydrophilic adhesive composition was prepared in a similar way as in Example 1 and 2, except that the compounded ingredients were the following:

| | |
|---|---|
| PVP/VA S630 (adhesive copolymer available from ISP) | 10% |
| Hytrel 8171 (poly-ether ester available from Du Pont) | 15% |

-continued

| | |
|---|---|
| Eastman A 2683 | 20% |
| (tackifying resin available from Eastman) | |
| Uniplex 280 | 20% |
| (sucrose benzoate plasticizer available from Unitex) | |
| Poly-ethylene glycol di-benzoate | 25% |
| (plasticizer available from Aldrich) | |
| Tri-ethyl citrate | 9% |
| (plasticizer available from Aldrich) | |
| Irganox B 225 | 1% |
| (antioxidant available from Ciba-Geigy) | |

The composition contains 9% by weight of tri-ethyl citrate and 10% by weight of PVP/VA copolymer which are both ingredients soluble in the physiological saline solution used as test liquid for liquid absorption capacity and liquid absorption rate. Therefore when tested for liquid absorption capacity and liquid absorption rate, according to the Liquid Absorption Test method described herein, the reference initial weight of the "dry" film before contact with the test liquid was considered to be 81% of the actually measured weights of the dry films in the tested samples, represented by the term $[S_{dry\ i} - NW_{dry\ i}]$ in the formula of the Liquid Absorption Test. Under such testing conditions, the composition showed a maximum liquid absorption capacity in 24 hours of 0.83 g/g. In the first 60 seconds of immersion in the test liquid, the composition absorbs 0.54 g/g i.e. 65% of its maximum liquid absorption capacity in 24 hours.

The rheological parameters of the composition at 37° C. were found to be:

$G'_{37}$, 1 rad/s=5.04·10$^4$ Pa $G''_{37}$, 1 rad/s=3.86·10$^3$ Pa $(G'_{37}$, 100 rad/s/$G'_{37}$, 1 rad/s)=6.23

Example 4

A thermoplastic hydrophilic adhesive composition was prepared in a similar way as in Examples 1 to 3, except that the compounded ingredients were the following:

| | |
|---|---|
| PVP/VA S630 | 10% |
| (adhesive copolymer available from ISP) | |
| Hytrel 8171 | 7.5% |
| (poly-ether ester available from Du Pont) | |
| Elvax 40-W | 7.5% |
| (EVA copolymer, containing 40% by weight of vinyl acetate, available from Du Pont) | |
| Eastman A 2683 | 20% |
| (tackifying resin available from Eastman) | |
| Uniplex 280 | 20% |
| (sucrose benzoate plasticizer available from Unitex) | |
| Poly-ethylene glycol di-benzoate | 25% |
| (plasticizer available from Aldrich) | |
| Tri-ethyl citrate | 9% |
| (plasticizer available from Aldrich) | |
| Irganox B 225 | 1% |
| (antioxidant available from Ciba-Geigy) | |

The composition contains 9% by weight of tri-ethyl citrate and 10% by weight of PVP/VA copolymer which are ingredients soluble in the physiological saline solution used as test liquid for liquid absorption capacity and liquid absorption rate. Therefore when tested for liquid absorption capacity and liquid absorption rate, according to the Liquid Absorption Test method described herein, the reference initial weight of the "dry" film before contact with the test liquid was considered to be 81% of the actually measured weights of the dry films in the tested samples, represented by the term $[S_{dry\ i} - NW_{dry\ i}]$ in the formula of the Liquid Absorption Test. Under such testing conditions, the composition showed a maximum liquid absorption capacity in 24 hours of 0.78 g/g. In the first 60 seconds of immersion in the test liquid, the composition absorbs 0.49 g/g i.e. 63% of its maximum liquid absorption capacity in 24 hours.

The rheological parameters of the composition at 37° C. were found to be:

$G'_{37}$, 1 rad/s=1.2·10$^4$ Pa $G''_{37}$, 1 rad/s=1.1·10$^4$ Pa $(G''_{37}$, 100 rad/s/$G'_{37}$, 1 rad/s)=8.4

Test Method

Liquid Absorption Test

The Liquid Absorption Test measures the maximum liquid absorption capacity in 24 hours and the liquid absorption rate of the thermoplastic hydrophilic homogeneous polymeric matrix comprised in the adhesive composition of the present invention, as well as the maximum liquid absorption capacity in 24 hours of the first polar cohesive thermoplastic polymer or polymers and of the second polar adhesive thermoplastic polymer or polymers comprised in the matrix according to the present invention.

Apparatuses:
Balance: analytical, capable of reading 0.001 g
Oven: capable of maintaining uniform temperatures of 80° C.±3° C.
Climatized room at 23° C.; 50% R.H. (Relative Humidity)
Preparation of the Film The composition (i.e. the thermoplastic hydrophilic homogeneous polymeric matrix, as defined herein) or the pure polymer under test is extruded from the molten state onto siliconized paper in the form of a film having a thickness of about 150 µm. The film is then let to cool down to room conditions.

Alternatively, the components of the composition under test, or the pure polymer under test, are/is dissolved in tetrahydrofurane (THF) or any other suitable solvent at a concentration of 30% solid by weight for the composition, and of 10% solid by weight for the pure polymer, owing to the higher viscosity of its solution. The solution is coated onto siliconized paper using a Mayer Bar 500 available from RK Print-Coat Instruments.

The solution coated onto the siliconized paper is dried in the oven at 80° C.±3° C. for 30 minutes in order to completely evaporate the solvent. This results in a final film from the composition solution having the desired thickness of 150 µm. The film obtained from the pure polymer solution has a thickness of about 50 µm, therefore the coating and drying process is repeated two more times on the same film in order to have a final film with the desired thickness of 150 µm.

Preparation of the Samples

The film is then laid and adhered onto a non absorbing, pure polypropylene spunbonded nonwoven, having a nominal basis weight of 8 g/m$^2$ and available from the Company Linotec under the commercial code A08AJO. Circular samples having an area of 10 cm$^2$ are cut using a circular cutter Model 230/10 available from James H. Heal Ltd. Samples are conditioned at 23° C., 50% R.H. for 12 hours before testing. The test is performed at 23° C. and 50% R.H.

A physiological solution is prepared by dissolving 0.9% by weight of NaCl available from Aldrich in distilled water.

Ten samples for each composition or pure polymer are tested in parallel. Each conditioned sample is placed in a container and completely immersed into 50 g of the above physiological solution at a temperature of 23° C. At fixed time intervals of 1 minute, 5 minutes, 30 minutes, 90 minutes, and 24 hours, the samples are removed from the solution one at a time, and after all surface water is wiped off with a dry cloth they are immediately weighed to the nearest 0.001 g. For intermediate times, the samples, after weighing, are placed again in the liquid and weighed again at the next time interval following the same procedure.

In parallel, samples made of the nonwoven alone, having the same shape and area as the ones used in combination with the film and conditioned as explained above, are tested in the same way to detect the liquid possibly retained, e.g. by capillarity, by the nonwoven.

All conditioned samples under test are also always weighed before contact with liquid.

Each point of the absorption curve is obtained by the average value of the ten samples used.

For each time interval the absorbed liquid at time "t", expressed as g/g of composition or polymer, is calculated as follows:

Absorbed liquid=$\{[S_{wet\ t} - NW_{wet\ t}]/[S_{dry\ i} - NW_{dry\ i}]-1\}$ where:

$S_{wet\ t}$=weight of the wet samples (film+nonwoven) after t minutes of soaking $NW_{wet\ t}$=weight of the pure nonwoven sample after t minutes of soaking $S_{dry\ i}$=initial weight of the conditioned sample (film+nonwoven) before contact with the liquid $NW_{dry\ i}$=initial weight of the pure conditioned nonwoven sample before contact with liquid The maximum liquid absorbent capacity in 24 hours is represented by the highest value obtained in the five measurements at the respective time intervals.

The liquid absorption rate corresponds to the percentage of the maximum absorption capacity in 24 hours represented by the liquid absorption capacity at 1 minute.

To note that, because the compositions according to the present invention may contain certain amounts (i.e. overall hot more than 25%, preferably not more that 15% and more preferably not more than 10% of the thermoplastic hydrophilic homogeneous polymeric matrix) of ingredients which are soluble or dispersible into the test liquid, the parameter $S_{dry\ i}$ in the above formula, for the part referred to the weight of the film of the composition, is calculated with reference to the sole weight fraction of the composition which does not include the ingredient or ingredients which is/are known or suspected to be soluble or dispersible in the test liquid.

To note also, that in the above test the absorption capacity of a pure polymer which is soluble or dispersible in the test liquid would be considered to be infinite. Compositions totally made of components which are soluble or dispersible in the test liquid, on the other hand, are not within the scope of the present invention. A polymer is considered to be soluble or dispersible when it is soluble or dispersible in the test liquid in a concentration of at least 0.3% by weight.

The invention claimed is:

1. An adhesive composition comprising a thermoplastic hydrophilic homogeneous polymeric matrix, said adhesive composition having a moisture vapor transmission rate of at least 200 g/m² 24 h, an elastic modulus at 37° C., $G'_{37}$, and a viscous modulus at 37° C., $G''_{37}$, said thermoplastic hydrophilic homogeneous polymeric matrix having a 24-hour maximum liquid absorption capacity ranging from 0.02 g/g to 5 g/g, and a liquid absorption rate defined by said polymeric matrix having a liquid absorption capacity at 1 min that is at least 15% of said 24-hour maximum liquid absorption capacity;

wherein said elastic modulus $G'_{37}$ (1 rad/s) ranges from 100 Pa to 500,000 Pa;

wherein said viscous modulus $G''_{37}$ (1 rad/s) ranges from 50 Pa to 200,000 Pa;

wherein the ratio $G'_{37}$ (100 rad/s)/$G\Delta_{37}$ (1 rad/s)<20; and further wherein said thermoplastic hydrophilic homogeneous polymeric matrix comprises:

a first polar cohesive thermoplastic polymer or blend of polar cohesive thermoplastic polymers;

a second polar adhesive thermoplastic polymer or blend of polar adhesive thermoplastic polymers;

a compatible plasticiser or blend of compatible plasticisers; and, optionally, a tackifying, resin or blend of tackifying resins.

2. The adhesive composition of claim 1, wherein said first polar cohesive thermoplastic polymer or at least one polymer of said blend of polar cohesive thermoplastic polymers is a thermoplastic elastomer.

3. The adhesive composition of claim 1, wherein said first polar cohesive thermoplastic polymer or at least one polymer in said blend of polar cohesive thermoplastic polymers has a 24-hour maximum liquid absorption capacity of at least 0.01 g/g.

4. The adhesive composition of claim 1, wherein said second polar adhesive thermoplastic polymer or at least one polymer in said blend of polar adhesive thermoplastic polymers has a 24-hour maximum liquid absorption capacity of at least 0.01 g/g.

5. The adhesive composition of claim 1, wherein said first polar adhesive thermoplastic polymer or blend of polar cohesive thermoplastic polymers and said second thermoplastic polymer or blend of polar cohesive thermoplastic polymers comprise not more than 70% by weight of a thermoplastic polymer or polymers having a maximum 24-hour liquid absorption capacity of less than 0.01 g/g.

6. The adhesive composition of claim 1, wherein said thermoplastic hydrophilic homogeneous polymeric matrix further comprises:

from 1% by weight to 50% by weight of said matrix of said first polar cohesive thermoplastic polymer or blend of polar cohesive thermoplastic polymers;

from 1% by weight to 80% by weight of said matrix of said second adhesive thermoplastic polymer or blend of polar adhesive thermoplastic polymers;

from 5% by weight to 85% by weight of said matrix of said compatible plasticiser or blend of compatible plasticisers; and, from 0% by weight to 45% by weight of said matrix of said tackifying resin or blend of tackifying resins.

7. The adhesive composition of claim 1, wherein said first polar cohesive thermoplastic polymer or blend of polar cohesive thermoplastic polymers is selected from the group consisting of polyurethanes, polyether-, polyester-, and polyetherester-amide block copolymers, ionomers, polyesters and copolyesters, polyetherester block copolymers, polyamides and copolyamides, polyethylene vinylacetate with vinylacetate content of at least 28%, polyethylene acrylic and methacrylic ester copolymers, polyethylene acrylic acid copolymers, polyethylene vinyl alcohol copolymers, styrenic block copolymers and polyolefins polarly modified by insertion or grafting of, or by copolymerization with, highly polar groups/monomers such as maleic or succinic anhydride, carbon monoxide, sulphonic groups, etc., and blends thereof.

8. The adhesive composition of claim 1, wherein said second polar adhesive thermoplastic polymer or blend of polar adhesive thermoplastic polymers is selected from the group consisting of sulfonated polyesters, thermoplastic polyacrylates, polyvinyl pyrrolidone and its copolymers such as polyvinyl pyrrolidone vinyl acetate copolymer, polyvinyl ethers, polyvinyl alcohol, polyethylene oxide, polyketones, and blends thereof.

9. The adhesive composition of claim 1, wherein said compatible plasticiser or blend of compatible plasticisers is selected from the group consisting of citric acid esters, tartaric acid esters, benzoic acid esters, sucrose esters, tri-mellitates, sorbitol, urea, epoxidized vegetable oils, polymerised vegetable oils, castor oil and its derivatives, phthalates, liquid polyesters, liquid polyamides, glycolates, aromatic sulfonamides, polyhydric alcohols and their esters, glycerol and its esters, pentaerythritol and its esters, glycols and polyglycols and their esters and ethers, polyethylene glycol- polypropylene glycol block copolymers, sorbitan esters, phosphates, lactic acid and its esters, mono- and dicarboxylic fatty acids ($C_8$–$C_{22}$) and their esters, esters of mono- and dicarboxylic fatty acids ($C_8$–$C_{22}$) hydrophilically modified by insertion in the molecular chain of 1 to 40 moles of ethylene oxide and/or of propylene oxide per mole of base ester, polyethers and their derivatives, and blends thereof.

10. The adhesive composition of claim 1, wherein said optional tackifying resin or blend of tackifying resins is selected from the group consisting of rosins and rosin esters, aromatic and aliphatic-aromatic resins, terpene and terpene-phenolic resins, aromatic acrylic resins, and blends thereof.

11. The adhesive composition of claim 1, wherein said thermoplastic hydrophilic homogeneous polymeric matrix comprises not more than 25% by weight of said matrix of one or more components which are soluble or dispersible in a saline solution containing 0.9% by weight of sodium chloride in water.

12. The adhesive composition of claim 1, wherein said thermoplastic hydrophilic homogeneous polymeric matrix has a complex viscosity, $\eta^*$, in the range of 5 poise<$\eta^*$<4,000 poise at a frequency of 1 rad/s, and $\eta^*$<2000 poise at a frequency of 1000 rad/s, said complex viscosities at having a process temperature, T, ranging from 110° C. to 210° C.

13. The adhesive composition of claim 1, wherein said adhesive composition comprises an inorganic solid filler compound or blend of inorganic solid filler compounds dispersed into said thermoplastic hydrophilic homogeneous polymeric matrix.

14. The adhesive of claim 1, said adhesive being disposed upon a wearer facing surface of a disposable human waste management device, said disposable human waste management device comprising a bag having an aperture and a flange surrounding said aperture for adhesive attachment to the urogenital and/or perianal area of a wearer, said flange comprising said wearer facing surface comprising said adhesive composition.

* * * * *

UNITED STATES PATENT AND TRADEMARK OFFICE
CERTIFICATE OF CORRECTION

PATENT NO. : 7,232,858 B2
APPLICATION NO. : 10/633963
DATED : June 19, 2007
INVENTOR(S) : Lidia Bonfanti et al.

It is certified that error appears in the above-identified patent and that said Letters Patent is hereby corrected as shown below:

<u>Column 1</u>

Line 9, delete "the thermoplastic" and insert --thermoplastic--.

<u>Column 3</u>

Line 19, delete "adhesive at" and insert --adhesive, at--.

<u>Column 4</u>

Line 21, delete "loose," and insert --lose--.

Line 31, delete "liquid:" and insert --liquid.--.

<u>Column 5</u>

Line 31, delete "provided" and insert --provide--.

Line 56, after the word "movements" insert --and--.

Line 62, delete "adhesive" and insert --adhesives--.

<u>Column 6</u>

Line 54, after the word components delete ",".

<u>Column 7</u>

Line 2, delete "hydrohilic" and insert --hydrophilic--.

<u>Column 8</u>

Line 63, after the phrase "expressed as" delete --,--.

<u>Column 9</u>

Line 32, delete "thermoplastics" and insert --thermoplastic--.

Lines 66 and 67, after the word "adhesive" delete --,--.

UNITED STATES PATENT AND TRADEMARK OFFICE
CERTIFICATE OF CORRECTION

PATENT NO.       : 7,232,858 B2
APPLICATION NO.  : 10/633963
DATED            : June 19, 2007
INVENTOR(S)      : Lidia Bonfanti et al.

It is certified that error appears in the above-identified patent and that said Letters Patent is hereby corrected as shown below:

Column 10

Line 49, after the word "more" delete --,--.

Line 56, after the phrase "all such" delete --,--.

Line 61, after the word "suitably" delete --,--.

Line 61, after the word "those" delete --.--.

Column 12

Line 20, delete "methacryate" and insert --methacrylate--.

Line 37, delete "polyester" and insert --polyesters--.

Line 64, after the word "more" delete --,--.

Column 13

Line 18, after the word hydrophilic delete --;--.

Line 28, after the number 2000 delete "pose" and insert --poise--.

Column 14

Line 55, after the word "selected" insert --among--.

Column 15

Line 34, after the word "are" delete --,--.

Column 16

Line 41, after the word "invention" insert --,--.

Column 17

Line 62, after the word "asymmetrical" insert --,--.

UNITED STATES PATENT AND TRADEMARK OFFICE
CERTIFICATE OF CORRECTION

PATENT NO. : 7,232,858 B2
APPLICATION NO. : 10/633963
DATED : June 19, 2007
INVENTOR(S) : Lidia Bonfanti et al.

It is certified that error appears in the above-identified patent and that said Letters Patent is hereby corrected as shown below:

<u>Column 18</u>

Line 59, before the word "lipstick" insert --(--.

<u>Column 22</u>

Line 17, in the formula, delete "G" " and insert --G'--.

<u>Column 23</u>

Line 51, delete "hot" and insert --not--.

<u>Column 24</u>

Line 17, in the formula, delete "GΔ" and insert --G'--.

Signed and Sealed this

Thirteenth Day of May, 2008

JON W. DUDAS
*Director of the United States Patent and Trademark Office*